United States Patent [19]

Johnson

[11] Patent Number: 4,604,323

[45] Date of Patent: Aug. 5, 1986

[54] MULTILAYER CATION EXCHANGE MEMBRANE

[75] Inventor: Bruce B. Johnson, Wallingford, Pa.

[73] Assignee: E. I. Du Pont de Nemours and Company, Wilmington, Del.

[21] Appl. No.: 704,530

[22] Filed: Feb. 22, 1985

[51] Int. Cl.$^4$ .................. B32B 27/00; C25B 1/46; C25B 13/08

[52] U.S. Cl. .................. 428/336; 428/421; 428/422; 204/252; 156/228; 156/DIG. 73

[58] Field of Search .................. 428/336, 421, 422

[56] References Cited

U.S. PATENT DOCUMENTS

| | | | |
|---|---|---|---|
| 3,692,569 | 9/1972 | Grot | 117/138.8 |
| 4,259,226 | 3/1981 | Sahara et al. | 260/33.4 F |
| 4,329,434 | 5/1982 | Kimoto et al. | 521/27 |
| 4,348,310 | 9/1982 | Silva et al. | 524/167 |
| 4,433,082 | 2/1984 | Grot | 524/755 |

FOREIGN PATENT DOCUMENTS

| | | |
|---|---|---|
| 53-92394 | 8/1978 | Japan . |
| 55-50470 | 4/1980 | Japan . |
| 1286859 | 8/1972 | United Kingdom . |

*Primary Examiner*—P. C. Ives

[57] ABSTRACT

A cation exchange membrane is disclosed comprising fluorinated polymer layers which include, in order, a layer with sulfonic exchange groups, a layer with carboxylic exchange groups, and a thinner layer with carboxylic exchange groups at a greater exchange capacity than the other carboxylic layer.

2 Claims, No Drawings

MULTILAYER CATION EXCHANGE MEMBRANE

SUMMARY OF THE INVENTION

The present invention relates to cation exchange membranes for electrochemical cells, and to their use, especially for the electrolysis of alkali metal chloride solutions to make relatively concentrated alkali metal hydroxide. An advantage to making concentrated caustic solutions is that relatively little energy is required to evaporate water from the caustic to yield a solution of about 50% by weight.

In particular, the present invention is a three-layer fluorinated membrane with at least one fluorine atom on the carbon adjacent to each functional group. The layers are adhered together and are, in order:

(a) a first layer consisting essentially of polymer with sulfonic ion exchange groups.

(b) a second layer adhered to the first layer consisting essentially of polymer with carboxylic ion exchange groups, and (c) a third layer adhered to the second layer having a thickness of less than 25 microns and consisting essentially of polymer with carboxylic ion exchange groups having an ion exchange capacity at least 0.1 milliequivalent/gram of dry resin greater than that of the second layer.

DETAILED DESCRIPTION OF THE INVENTION

In the preferred practice of this invention, the layer (c) is applied to a membrane containing layers (a) and (b) by coating, repetitively if desired, with a solution or non-aqueous dispersion of the polymer of layer (c), drying between coats. Then the layers are hot pressed together.

The preferred way to make a bimembrane with layers (a) and (b) is by coextrusion. Layer (c) can be applied by heat-laminating a film of layer (c) to the bimembrane of (a) and (b), but it is difficult to make a film thinner than 25 microns. Therefore the preferred process for applying layer (c) is to make a solution or non-aqueous dispersion of its polymer, cast it on the (b) surface of the bimembrane of (a) and (b), and dry to remove the solvent. These steps may be repeated if necessary to build up the desired thickness of layer (c), then heat pressing may be used to adhere the layer (c) more thoroughly.

The solutions and non-aqueous dispersions for use in this coating process may be of various types, among which are:

(1) The carboxylic polymer is in the form of the methyl ester and the solvent is n-butyl perfluorooctanoate (U.S. Pat. No. 4,348,310).

(2) The carboxylic polymer is in the salt form and the polar organic solvent may be an alcohol, glycol, dimethyl formamide, dimethyl sulfoxide, acetone, and the like (U.S. Pat. No. 4,327,010).

(3) The carboxylic polymer is in the ester form (for example, the decyl ester) and the solvent is $FCCl_2CF_2Cl$ or $C_6H_5CF_3$ or its substitution product (laid open No. J55/149336).

(4) The carboxylic polymer is synthesized as an aqueous dispersion, which is converted to a hydrophilic non-aqueous dispersion in a compound such as an alcohol, ketone, organic acid, ether, and the like. Laid open No. J57/115426 teaches the preparation of such dispersions and their use for coating membranes.

The membrane of this invention gives better resistance to delamination than a bimembrane of layers (a) and (c), alone.

The membrane of this invention, with layers (a), (b), and (c), represents an improvement in chloralkali membranes from at least two points of view. First, it is widely recognized that increased ion exchange capacity in carboxyl membranes permits electrolytic production of sodium hydroxide in increased concentration. It is believed that the high ion exchange capacity of layer (c) of this invention permits operation in high concentration caustic. Second, it is, also, widely recognized that increased ion exchange capacity in carboxyl membranes increases the difficulty of laminate membrane fabrication. It is believed that the lower ion exchange capacity of layer (b) facilitates fabrication of the laminated membrane of this invention. An example of the above, well-known, points of view in a single reference is found in United Kingdom Patent No. 2,047,271.

Three-layer membranes have been disclosed. (Laid-open No. J55/50470; laid-open No. J53/92394, published as No. J82/9509).

The carboxylic polymers with which the present invention is concerned have a fluorinated hydrocarbon backbone chain to which are attached the functional groups or pendant side chains which in turn carry the functional groups. When the polymer is in melt-fabricable form, the pendant side chains can contain, for example,

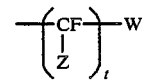

groups wherein Z is F or $CF_3$, t is 1 to 12, and W is —COOR or —CN, wherein R is lower alkyl. Preferably, the functional group in the side chains of the polymer will be present in terminal

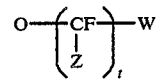

groups wherein t is 1 to 3.

By "fluorinated polymer", used herein, for carboxylate and for sulfonyl polymers, is meant a polymer in which, after loss of any R group by hydrolysis to ion exchange form, the number of F atoms is at least 90% of the total number of F, H, and Cl atoms in the polymer. For chloralkali cells, perfluorinated polymers are preferred, though the R in any COOR group need not be fluorinated because it is lost during hydrolysis.

Polymers containing

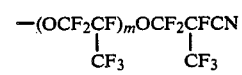

side chains, in which m is 0, 1, 2, 3 or 4, are disclosed in U.S. Pat. No. 3,852,326.

Polymers containing —$(CF_2)_p$COOR side chains, where p is 1 to 18, are disclosed in U.S. Pat. No. 3,506,635.

Polymers containing

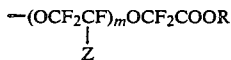

side chains, where Z and R have the meaning defined above and m is 0, 1, or 2 (preferably 1) are disclosed in U.S. Pat. No. 4,267,364.

Polymers containing terminal —O(CF$_2$)$_v$W groups, where W is as defined above and v is from 2 to 12, are preferred. They are disclosed in U.S. Pat. No. 3,641,104, U.S. Pat. No. 4,178,218, U.S. Pat. No. 4,116,888, British No. 2,053,902, EP No. 41737 and British No. 1,518,387. These groups may be part of

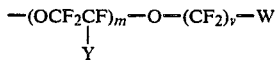

side chains, where Y=F or CF$_3$ or CF$_2$Cl. Especially preferred are polymers containing such side chains where v is 2, which are described in U.S. Pat. No. 4,138,426 and S. Afr. No. 78/002225, and where v is 3, which are described in U.S. Pat. No. 4,065,366. Among these polymers, those with m=1 and Y=CF$_3$ are most preferred.

The above references describe how to make these polymers.

The sulfonyl polymers with which the present invention is concerned are fluorinated polymers with side chains containing the group

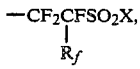

wherein R$_f$ is F, Cl, CF$_2$Cl or a C$_1$ to C$_{10}$ perfluoroalkyl radical, and X is F or Cl, preferably F. Ordinarily, the side chains will contain —OCF$_2$CF$_2$CF$_2$SO$_2$X or —OCF$_2$CF$_2$SO$_2$F groups, preferably the latter. For use in chloralkali membranes, perfluorinated polymers are preferred.

Polymers containing the side chain

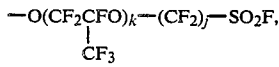

where k is 0 or 1 and j is 3, 4, or 5, may be used. These are described in British No. 2,053,902.

Polymers containing the side chain —CF$_2$CF$_2$SO$_2$X are described in U.S. Pat. No. 3,718,627.

Preferred polymers contain the side chain

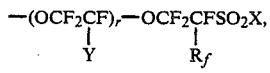

where R$_f$, Y, and X are as defined above and r is 1, 2, or 3, and are described in U.S. Pat. No. 3,282,875. Especially preferred are copolymers containing the side chain

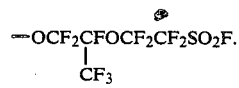

Polymerization can be carried out by the methods described in the above references. Especially useful is solution polymerization using ClF$_2$CCFCl$_2$ solvent and (CF$_3$CF$_2$COO—)$_2$ initiator. Polymerization can also be carried out by aqueous granular polymerization as in U.S. Pat. No. 2,393,967, or aqueous dispersion polymerization as in U.S. Pat. No. 2,559,752 followed by coagulation as in U.S. Pat. No. 2,593,583.

The copolymers used in the layers described herein should be of high enough molecular weight to produce films which are self-supporting in both the melt-fabricable precursor form and in the hydrolyzed ion exchange form.

A membrane having at least one layer of a copolymer having sulfonyl groups in melt-fabricable form and a layer of a copolymer having carboxyl groups in melt-fabricable form, such as made by coextrusion, can be used as one of the component films in making the membrane of the invention. Such a laminated structure may be referred to in this application as a bimembrane. Preparation of bimembranes is described in Japanese laid-open application No. K52/36589, published as No. J83/33249.

The customary way to specify the structural composition of films or membranes in this field is to specify the polymer composition, ion-exchange capacity or equivalent weight, and thickness of the polymer films in melt-fabricable form, from which the membrane is fabricated. This is done because the measured thickness varies depending on whether the membrane is dry or swollen with water or an electrolyte, and even on the ionic species and ionic strength of the electrolyte, even though the amount of polymer remains constant.

For use in ion exchange applications and in cells, for example a chloralkali cell for electrolysis of brine, the membrane should have all of the functional groups converted to ionizable functional groups. These will be sulfonic acid and carboxylic acid groups, or preferably alkali metal salts thereof. When the term "sulfonic ion exchange groups" is used, it includes not only the sulfonic acid group but particularly the alkali metal salts thereof. Similarly, the term "carboxylic ion exchange groups" means the carboxylic acid group and particularly the alkali metal salts thereof. The alkali metals preferred for use in this invention are potassium and sodium, particularly sodium, which leads to the production of sodium hydroxide.

Conversion to ionizable functional groups is ordinarily and conveniently accomplished by hydrolysis with acid or base, such that the various functional groups described above in relation to the melt-fabricable polymers are converted respectively to the free acids or the alkali metal salts thereof. Such hydrolysis can be carried out in an aqueous bath of mineral acid or alkali metal hydroxide. Hydrolysis in the hydroxide is preferred as it is faster and more complete. Use of hot hydrolysis baths, such as near the boiling point of the solution, is preferred for rapid hydrolysis. The time required for hydrolysis increases with the thickness of the structure. It is advantageous to include a water-miscible organic compound such as dimethyl sulfoxide in the hydrolysis bath, to swell the membrane to increase the rate of hydrolysis.

Membranes usually have an overall thickness of 50–250 micrometers, especially 125–200 micrometers. The ion-exchange capacity of the carboxylate polymer is in the range of 0.7–1.4 meq/g, preferably 0.8–1.2 meq/g dry resin, with higher ion-exchange capacities providing more concentrated caustic during operation of a chloralkali cell at maximum current efficiency. The ion-exchange capacity of the sulfonate polymer is in the range of 0.5–1.5 meq/g, preferably 0.7–1.2 meq/g dry resin.

The membrane may be unreinforced, but for dimensional stability and greater notched tear resistance, it is common to use a reinforcing material. It is customary to use a fabric made of a fluorocarbon resin such as polytetrafluoroethylene or a copolymer of tetrafluoroethylene with hexafluoropropylene (Teflon@ FEP fluorocarbon resin) or with perfluoro-(propyl vinyl ether) (Teflon@ PFA fluorocarbon resin). These may be woven into fabric using various weaves, such as the plain weave, basket weave, leno weave, or others. Relatively open weaves are favorable in that electrical resistance is lower. A porous sheet such as is disclosed in U.S. Pat. No. 3,962,153 may be used as a support. Other perhalogenated polymers such as polychlorotrifluoroethylene may also be used, but perfluorinated supports have the best resistance to heat and chemicals. The fibers used in the support fabrics may be monofilaments or multifilament yarns. They may be of ordinary round cross-section or may have specialized cross-sections. Oblong or rectangular cross-sections, if suitably oriented to the membrane, make it possible to get more reinforcing action with a thinner overall membrane. It may be desirable to use soluble or degradable fibers, such as rayon or paper, along with the fluorocarbon fibers, or in place of the fluorocarbon fibers. Care should be taken, however, not to have the soluble or degradable fibers extend from one surface to the other, or the non-porous membrane will become a porous diaphragm and, in the case of a chloralkali cell, the caustic product will contain too much salt. Even with a cloth or mesh of fluorocarbon fibers, it is preferred not to have the cloth penetrate the surface of the membrane on the cathode side. The fabric employed may be calendered before lamination to reduce its thickness. In a bimembrane, the fabric may be in the sulfonate or carboxylate layer or both, but is more often in the sulfonate layer, which is usually thicker. In place of fabric, nonwoven fibrils can be used.

The membrane or bimembrane may be used flat in various known filter press cells, or may be shaped around an electrode. The latter is especially useful when it is desired to convert an existing diaphragm cell to a membrane cell in order to make higher quality caustic.

Membranes can be swelled with polar solvents (such as lower alcohols or esters, tetrahydrofuran, or chloroform) and then dried, preferably between flat plates, to improve their electrolytic performance. Before mounting in commercial cell support frames, which may be 1–3 meters on a side, the membrane can be swelled so that it will not wrinkle after it is clamped in the frame and exposed to electrolytic fluids. Among the swelling agents that can be used are water, brine, caustic, lower alcohols, glycols, and mixtures thereof.

The cell can have two or three compartments, or even more. If three or more compartments are used, the membrane is commonly used next to the cathode compartment, and the other dividers may be porous diaphragms or membranes based on polymers having pendant side-chains with terminal $-CF_2-SO_3^-$ ion exchange groups only.

Bipolar or monopolar cells can be used. In ordinary use, the carboxylate side of the membrane will face the cathode. One can use (n) cells in series, with anolyte flowing from cell (1) to cell (n) and catholyte flowing from cell (n) to cell (1). The cells may use identical membranes or different membranes may be used in different cells. Membranes using only polymers having pendant side chains with terminal $-CF_2-SO_3^-$ groups may be used in cell (n) and possibly others near it. Cell (n) may be two or more cells in parallel.

The membrane may be disposed horizontally or vertically in the cell, or at any angle from the vertical.

Any of the conventional electrodes or electrode configurations may be used. The anode for a chloralkali cell should be resistant to corrosion by brine and chlorine, resistant to erosion, and preferably should contain an electrocatalyst to minimize chlorine overvoltage. The well-known dimensionally stable anode is among those that are suitable. A suitable base metal is titanium, and the electrocatalysts include reduced platinum group metal oxides (such as Ru, and the like) singly or in mixtures, optionally admixed with a reduced oxide of Ti, Ta, Cb, Zr, Hf, V, Pt, or Ir. The electrocatalysts may be heat treated for stability.

The anode may be a 'zero-gap' anode, against which the membrane is urged and which anode is permeable to both liquids and gases. The anode may be kept a small distance from the membrane by the use of a spacer, against which the membrane is urged by a small hydraulic head on the other side of the membrane. The spacer may be made of a plastic which is resistant to the chemicals in the anolyte, such as polytetrafluoroethylene, ethylene/tetrafluoroethylene copolymer, or polychlorotrifluoroethylene. It is desirable that the spacer or the electrode should have open vertical channels or grooves to facilitate the escape of gas evolved at the anode. Whether or not there is a spacer, it may be desirable to have the anode openings slanted so the gas is carried away from the membrane and anolyte circulation past the membrane is maximized. This effect can be augmented by using downcomers for anolyte which has been lifted by the rising gas bubbles. The anode may be a screen or perforated plate or powder which is partially embedded in the anode surface layer of the bimembrane. In this case, the current may be supplied to the anode by current distributors which contact the anode at numerous closely-spaced points. The anode may be a porous catalytic anode attached to or pressed against the membrane or attached to or pressed against a porous layer, which is in turn attached to or pressed against the membrane.

The cathode for a chloralkali cell should be resistant to corrosion by the catholyte, resistant to erosion, and preferably may contain an electrocatalyst to minimize hydrogen overvoltage. The cathode may be mild steel, nickel, or stainless steel, for example, and the electrocatalyst may be platinum black, palladium, gold, spinels, manganese, cobalt, nickel, Raney nickel, reduced platinum group metal oxides, alpha-iron and the like.

The cathode may be a 'zero-gap' cathode, against which the membrane is urged and which cathode is permeable to both liquids and gases. The cathode may be kept a small distance from the membrane by the use of a spacer, against which the membrane is urged by a small hydraulic head on the other side of the membrane. In the case of a three-compartment cell, both membranes may be urged against electrodes or spacers by a hydraulic head on the center compartment. The spacer may be made of a plastic which is resistant to the chemicals in the catholyte, such as polytetrafluoroethylene, ethylene/tetrafluoroethylene resin, or polychlorotrifluoroethylene. It is desirable that the cathode spacer or electrode have open vertical channels or grooves to facilitate the escape of gas evolved at the cathode. Whether or not there is a spacer, it may be desirable to have the cathode openings slanted so the gas is carried away from the membrane and catholyte flow past the membrane is maximized. This effect may be augmented by using downcomers for catholyte which has been lifted by rising gas bubbles. The cathode may be a porous cathode, pressed against the membrane or pressed against a porous layer, which is in turn attached to or pressed against the membrane.

An oxygen cathode can be used, in which oxygen is supplied to the cathode and substantially no hydrogen is evolved, with the result being lower cell voltage. The oxygen may be supplied either by bubbling through the catholyte and against the cathode, or by feeding oxygen-containing gas through a porous inlet tube which also serves as cathode and is coated with electrocatalyst.

It has long been known that in the electrolysis of brine to make chlorine and caustic, it is desirable to use NaCl of low Ca and Mg content. It is also well known how to remove hardness from sodium chloride solutions to very low levels. Heavy metals like iron and mercury and foreign anions such as iodide should also be substantially removed. Some of the contaminants in make-up brine can be removed by passing the brine through a diaphragm cell before it is fed to the membrane cell system. Further hardness reductions can be achieved by passing the brine through a chelate ion exchanger, preferably one containing $-NHCH_2COOH$ groups, or a phosphate may be added to the brine to precipitate insoluble salts.

Brine fed to the cell is usually close to the saturation concentration, but lower brine concentration is acceptable. Brine leaving the anolyte chamber may be as low as about 2% by weight NaCl, but is more often 10-15 wt % NaCl, or even higher.

Because a bimembrane or three-layer membrane has lower electrical resistance than an all-carboxylate membrane, it can be operated at lower voltage or higher current density. Good results can be obtained at 10-70 $A/dm^2$, preferably 30-50 $A/dm^2$.

It is desirable to acidify the anolyte to minimize the formation of oxygen and chlorate at the anode. Overacidification is not as serious an error in the case of the membrane of this invention as in the case of an all-carboxylate membrane, because the $-CF_2SO_3H$ group is a stronger acid than the $-CF_2COOH$ group, and the sulfonate form, $-CF_2SO_3^-$, resists conversion to the acid form by overacidification more strongly than does the carboxylate ion form. The free acids are to be avoided because they increase membrane voltage.

Anolyte acidity is normally adjusted to a value in the range of pH 1-5 by addition of hydrochloric acid or hydrogen chloride to the recycle brine. Recycle brine may be concentrated by addition of solid salt and/or by evaporating or distilling water from the stream.

While membrane cells are frequently operated at approximately atmospheric pressure, there can be advantages to operating them at elevated pressure. While direct current is ordinarily used in membrane cells, one can also use pulsed direct current or half-wave AC or rectified AC or DC with a square wave.

Chloralkali synthesis is normally carried out at about 70°-100° C. The catholyte can be kept 5°-20° cooler than the anolyte temperature.

In any of the above arrangements, either or both of the electrodes can have a catalytically active surface layer of the type known in the art for lowering the overvoltage of an electrode. Such electrocatalyst can be of a type known in the art, such as those described in U.S. Pat. Nos. 4,224,121 and 3,134,697, and UK No. 2,009,788A. Preferred cathodic electrocatalysts include platinum black, Raney nickel and ruthenium black. Preferred anodic electrocatalysts include platinum black and mixed ruthenium and titanium oxides.

The membranes described herein can also be modified on either surface or both surfaces thereof so as to have enhanced gas release properties, for example by providing optimum surface roughness or smoothness by hot roll embossing or by embossing with a porous paper. When embossing with a porous paper, a release paper can be applied to an outer surface of the membrane prior to passing through a laminator used, for example, to apply a reinforcement for the membrane. Such surface embossing is further described in Maloney, U.S. Pat. No. 4,349,422. Preferably the resulting surface roughness is about 2-5 microns as measured, for example, on a Bendix Model 1020 profilometer.

Preferably, the gas release properties of the membranes are enhanced by providing thereon a gas- and liquid-permeable porous non-electrode layer. Such non-electrode layer can be in the form of a thin hydrophilic coating or spacer and is ordinarily of an inert electroinactive or non-electrocatalytic substance. Such non-electrode layer should have a porosity of 10 to 99%, preferably 30 to 70%, and an average pore diameter of 0.01 to 2000 microns, preferably 0.1 to 1000 microns, and a thickness generally in the range of 0.1 to 500 microns, preferably 1 to 300 microns. A non-electrode layer ordinarily comprises an inorganic component and a binder; the inorganic component can be an inorganic compound which is chemically stable in hot concentrated caustic and chlorine, and can be of a type as set forth in UK No. 2,064,586, preferably tin oxide, titanium oxide, zirconium oxide, or an iron oxide such as $Fe_2O_3$ or $Fe_3O_4$. Other information regarding non-electrode layers on ion-exchange membranes is found in published European Patent Application No. 0,031,660, and in Japanese Laid-open Patent Applications Nos. 56-108888 and 56-112487. The particle size of the inorganic material can be about 1-100 microns, and preferably 1-10 microns.

The binder component in a non-electrode layer can be, for example, polytetrafluoroethylene, a fluorocarbon polymer at least the surface of which is hydrophilic by virtue of treatment with ionizing radiation in air or a modifying agent to introduce functional groups such as $-COOH$ or $-SO_3H$ (as described in published UK Patent Application GB No. 2,060,703A) or treatment with an agent such as sodium in liquid ammonia, a functionally substituted fluorocarbon polymer or copolymer which has carboxylate or sulfonate functional groups, or polytetrafluoroethylene particles modified on their surfaces with fluorinated copolymer having acid type functional groups (GB No. 2,064,586). Such binder can be used in an amount of about from 10 to 50% by wt. of the non-electrode layer or of the electrocatalyst composition layer. In addition to the inorganic component and the binder, the dispersion used to apply the inorganic component can include a thickener such as methyl cellulose or polyvinyl alcohol and a small amount of nonionic surfactant.

Composite structures having non-electrode layers thereon can be made by various techniques known in the art, which include preparation of a decal which is then pressed onto the membrane surface, spray application of a slurry in a liquid composition (for example, dispersion or solution) of the binder followed by drying, screen or gravure printing of compositions in paste form, hot pressing of powders distributed on the membrane surface, and other methods as set forth in British Patent No. 2,064,586 or Japanese Laid-open patent application No. J57/89490. Such structures can be made by applying the indicated layers onto membranes in melt-fabricable form, and by some of the methods onto membranes in ion-exchange form; the polymeric component of the resulting structures when in melt-fabricable form can be hydrolyzed in known manner to the ion-exchange form.

Membranes which carry thereon one or more non-electrode layers can be employed in an electrochemical cell in a narrow-gap or zero-gap configuration as described above.

EXAMPLES

In the examples, abbreviations are used as follows:

TFE/EVE refers to a copolymer of tetrafluoroethylene and methyl perfluoro(4,7-dioxa-5-methyl-8-noneoate);

TFE/PSEPVE refers to a copolymer of tetrafluoroethylene and perfluoro(3,6-dioxa-4-methyl-7-octenesulfonyl fluoride);

IEC refers to ion exchange capacity.

EXAMPLE 1

A membrane was prepared by thermally bonding together the following layers.
(a) A first layer consisting of a 102-micron (4 mil) layer of a TFE/PSEPVE copolymer having an IEC of 0.952.
(b) A second layer consisting of a 51-micron (2 mil) layer of TFE/EVE copolymer having an IEC of 0.909.

The two layers were pressed together and passed through a thermal laminator with the (a) layer supported on a web of porous release paper. The temperature of the heated zone of the laminator was adjusted such that the temperature of the polymer exiting the heated zone was 230°–235° C. as measured by an infrared measuring instrument.

After lamination, the membrane was hydrolyzed for 20 minutes at 90° C. in an aqueous bath containing 30% dimethylsulfoxide and 11% KOH.

To 150 ml of methanol was added 9 g of a TFE/EVE copolymer having an IEC of 1.01 which had been hydrolyzed to have the functional groups in the —COOLi form, and the mixture was refluxed for 20 hours. The resulting slurry was centrifuged, decanted, and filtered through a filter with 5 micron pores to yield a coating solution. Two ml of this solution was applied to the carboxylic surface of a 12.5 cm×12 cm piece of the aforemade laminate using a #40 Meyer rod. The solution was allowed to dry at room temperature. The resulting coated membrane was placed between two pieces of film of 4,4'-diaminodiphenyl ether polypyromellitimide and heated at 160° C. at a pressure of $8.4 \times 10^6$ pascals (1200 psi) for 2 minutes. The polyimide films were then stripped from the resulting coated membrane.

The coated membrane was soaked in a 2% NaOH solution for 1 hour at 70° C. and mounted in a 45 cm² chloralkali cell with the sulfonic layer toward the anode compartment and the coated surface toward the cathode compartment. The cell was assembled with a DSA (dimensionally stable anode) and a mild steel cathode. The anode-membrane gap was 3 mm and the cathode-membrane gap was 3 mm. The cell was operated at 80° C. with a current density of 3.1 KA/m². At 39.4% NaOH, the cell voltage was 3.7 V and current efficiency was 93.8%, resulting in a power consumption of 2640 KWH/MT NaOH.

CONTROL EXAMPLE

A piece of the uncoated laminate membrane described in Example 1 was soaked in a 2% NaOH solution for 1 hour at 70° C. and mounted in a 45 cm² chloralkali cell with the sulfonic layer toward the anode compartment and the carboxylic layer toward the cathode compartment. The cell was assembled as described in Example 1. At 40% NaOH, the cell voltage was 3.85 and the current efficiency was 91.2%, resulting in a power consumption of 2825 KWH/MT NaOH.

I claim:
1. A fluorinated cation exchange membrane having at least one fluorine atom on the carbon adjacent to each functional group and having three adhered layers which are, in turn,
   (a) a first layer consisting essentially of polymer with sulfonic ion exchange groups,
   (b) a second layer adhered to the first layer consisting essentially of polymer with carboxylic ion exchange groups, and
   (c) a third layer adhered to the second layer, having a thickness of less than 25 microns and consisting essentially of polymer with carboxylic ion exchange groups having an ion exchange capacity at least 0.1 milliequivalent/gram of dry resin greater than that of the second layer.
2. The membrane of claim 1 which is perfluorinated and has a third layer with a thickness of no more than 15 microns.

* * * * *